United States Patent [19]

Hattori et al.

[11] Patent Number: 5,400,668
[45] Date of Patent: Mar. 28, 1995

[54] SUPERCONDUCTING MAGNET MAGNETICALLY LEVITATED TRANSPORTATION APPARATUS

[75] Inventors: Toshio Hattori, Ushiku; Hiroshi Aoyama, Ibaraki; Saburo Usami; Toshio Ishizuki, both of Hitachi; Tosuke Hirata; Shigeru Sakamoto, both of Ibaraki; Yumiko Seki, Toyonaka; Tadasi Sonobe, Iwaki; Fumio Suzuki, Hitachi; Sueo Kawai, Ibaraki, all of Japan

[73] Assignee: Hitachi, Ltd., Tokyo, Japan

[21] Appl. No.: 996,138

[22] Filed: Dec. 23, 1992

[30] Foreign Application Priority Data

Dec. 26, 1991 [JP] Japan .................. 3-344401

[51] Int. Cl.6 .................. G01M 19/00; H01F 7/02; H01L 39/04; B60L 13/04
[52] U.S. Cl. .................. 73/865.9; 104/286; 335/216; 324/70.6
[58] Field of Search .................. 73/865, 865.8, 587, 73/788, 799, 801; 335/216, 219; 104/286; 505/902, 903, 907, 842, 843, 847, 879; 324/71.6

[56] References Cited

U.S. PATENT DOCUMENTS

| 3,015,960 | 1/1962 | Steele | 324/71.6 |
|---|---|---|---|
| 3,262,026 | 7/1966 | Rosner | 324/252 |
| 3,428,891 | 2/1969 | Purcell et al. | 324/71.6 X |
| 4,009,463 | 2/1977 | Vercellotti et al. | 73/587 |
| 4,140,021 | 2/1979 | Nomura et al. | 73/587 |
| 4,771,256 | 9/1988 | Laskaris et al. | 324/320 X |
| 5,059,891 | 10/1991 | Bohandy et al. | 324/71.6 |

FOREIGN PATENT DOCUMENTS

| 76888 | 5/1982 | Japan . | |
|---|---|---|---|
| 92584 | 5/1984 | Japan | 324/71.6 |
| 149105 | 7/1987 | Japan . | |
| 5504 | 1/1988 | Japan . | |
| 173879 | 7/1989 | Japan | 324/71.6 |
| 199958 | 8/1991 | Japan | 324/71.6 |

OTHER PUBLICATIONS

"A transformer for measuring 60 Hz loss end critical current characteristics of short superconductor tapes"; Cyrogenics, vol. 14, No. 5, pp. 316-320; E. B. Forsyth et al.

Patent Abstracts of Japan: ABS Group E091; vol. 6, No. 12, ABS pub. date Jan. 23, 1982 (S6-133885); ABS Group M233; vol. 7, No. 177, ABS pub. date Aug. 5, 1983 (58-81268); and ABS Group E1366, vol. 17, No. 249, ABS pub. date Mar. 18, 1993 (pub. Dec. 22, 1992 4-369876).

Primary Examiner—Tom Noland
Attorney, Agent, or Firm—Antonelli, Terry, Stout & Kraus

[57] ABSTRACT

A superconducting magnet includes a superconducting coil, an inner tank for containing the coil, a shield plate for covering the inner tank, and an outer tank for accommodating the superconducting coil, the inner tank and the shield plate. The inner tank is supported on the outer tank by a load support member and the outer tank forms a vacuum vessel. At least one of the inner tank, the load support member, the shield plate and the outer tank includes a detection arrangement for detecting abnormality and/or deterioration of the inner tank, load support member, shield plate and outer tank associated with the respective detection arrangement.

29 Claims, 6 Drawing Sheets

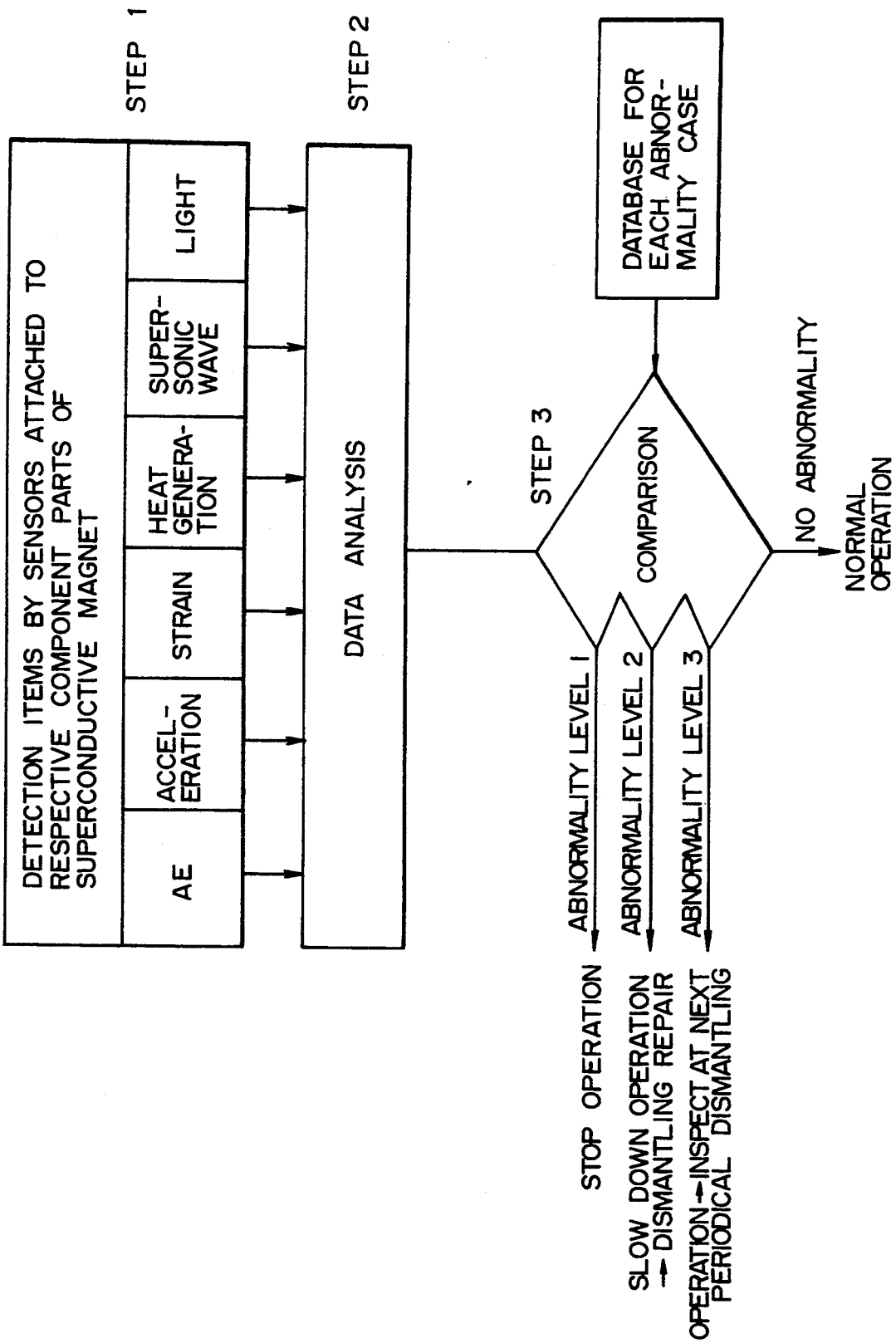

SUPERCONDUCTING MAGNET MAGNETICALLY LEVITATED TRANSPORTATION APPARATUS

BACKGROUND OF THE INVENTION

The present invention relates to superconducting magnets and more particularly, to a superconducting magnet suitable for use in a superconducting magnetically levitated trains, MRI (magnetic resonance imaging device), accelerators, nuclear fusion devices, and stationary energy storage devices.

A conventional superconducting magnet is proposed in Japanese Patent Laid-Open Publication No. 57-76888, which includes an inner tank for dipping a superconducting coil into liquid helium, a load support member coupled to a shield plate coupled k, with the load support member and shield plate completely sealed, for example, by welding into an outer tank serving as a vacuum vessel.

Other conventional constructions are disclosed, for example in Japanese Patent Laid-Open Publication Nos. 62-149105 and 63-5504.

Since, in the above described conventional constructions, the superconducting coil, the inner tank, the shield plate and the load support member are sealed into the outer tank which is fabricated by welding, an evaluation, during operation of the superconducting magnetic with respect to damage, deterioration or the like of the superconducting coil, inner tank, shield plate and load support member and repair and maintenance based on such evaluation are difficult.

SUMMARY OF THE INVENTION

Accordingly, it is an object of the present invention to provide a superconducting magnet and a magnetically levitated transportation apparatus using the same in which damage or deterioration on each component element of the superconducting magnet may be easily measured and evaluated during operation or periodic inspection and, on the basis of such evaluation, repair and maintenance thereof may be easily performed.

It should be noted that, in the present specification, a magnetically levitated transportation apparatus is not limited to a magnetically levitated train but it includes a transport system in general.

To achieve the above described object, in accordance with the present invention, detection means such as, for example an acoustic emission (AE) sensor, a supersonic sensor, a temperature sensor and an acceleration sensor are attached to the respective component elements within a superconducting magnet, so that abnormality may be easily detected during operation or periodic inspection. It is also possible to facilitate dismantling and reassembling of the superconducting magnet, for example, by providing a flange on the outer tank.

A superconducting magnet of the present invention is constructed so that it may be subjected to on-line monitoring from the inside and/or outside, for example, of the rolling stock of a magnetically levitated train even when it is traveling, and it may be monitored at a periodic inspection from the outside thereof by externally applying a load. To this end, one or more sensors are positioned preferably at each of all the points where a problem of abnormality and/or deterioration is most likely to occur, and it is preferably constructed so that dismantling, repair or the like thereof may be easily performed on the basis of thus obtained result.

An superconducting magnet of the present invention comprises a superconducting coil, with an inner tank for containing the coil, a shield plate for covering the inner tank, and an outer tank for accommodating the superconducting coil, inner tank, shield plate and upper tank. The inner tank is supported on the outer tank by a load support member and the outer tank is formed as a vacuum vessel, wherein at least one of the inner tank, the load support member, the shield plate and the outer tank includes detection means associated therewith for detecting abnormality and/or deterioration of the respective parts.

Further, in accordance with another aspect of the present invention, the outer tank includes an opening for the maintenance of the interior thereof, with the opening being closed by a flange, and an end portion of the flange is fixed to the outer tank by welding to facilitate its dismantling and reassembling.

Furthermore, a magnetically levitated transportation apparatus according to the present invention has superconducting magnet provided on the both sides of the body thereof. The superconducting magnet comprises a superconducting coil, an inner tank for containing the coil, a shield palate for covering the inner tank, and an outer tank for accommodating the foregoing elements. The inner tank is supported on the outer tank by a load support member and the outer tank is formed as a vacuum vessel. A device is provided which is capable of applying a dynamic or static load to the superconducting magnet from the outside of the superconducting magnet and at least one of the inner tank. The load support member, the shield plate and the outer tank includes means for detecting abnormality and/or deterioration of the respective portions, whereby diagnosis and/or evaluation of an abnormality and/or deterioration of the respective portions to be detected is possible based on the state of response of the detection means with respect to the load.

The superconducting magnet and the magnetically levitated transportation apparatus according to the present invention includes detection means such as, for example, AE sensor, supersonic sensor, strain gage and acceleration sensor on the superconducting coil, the inner tank, the shield plate, the load support member and/or the outer tank that are internally of the superconducting magnet thereof. Thus, if a damage such as a crack or separation occurs on the elements to which the detectors are attached, an actual measurement taken during operation or at a periodic inspection must differ from the result of an actual measurement taken prior to receiving the damage. By incorporating difference in the measurements and the number of incidents of damage into a database, the occurrence and extent of damage or deterioration and necessity of repair may be evaluated during operation or at a periodic inspection. Furthermore, when a repair is necessary based on such evaluation, the provision of of the on the outer tank facilitates a large number of dismantling and reassembling that may be repeatedly be performed. If for example welding is rendered at the periphery of the flange, it suffices to separate at the periphery at the time of dismantling or to reweld it at the time of assembling.

BRIEF DESCRIPTION OF THE DRAWINGS

FIG. 9 is a flowchart for using the apparatus as shown in FIG. 8.

DESCRIPTION OF THE PREFERRED EMBODIMENT

Figure 1:
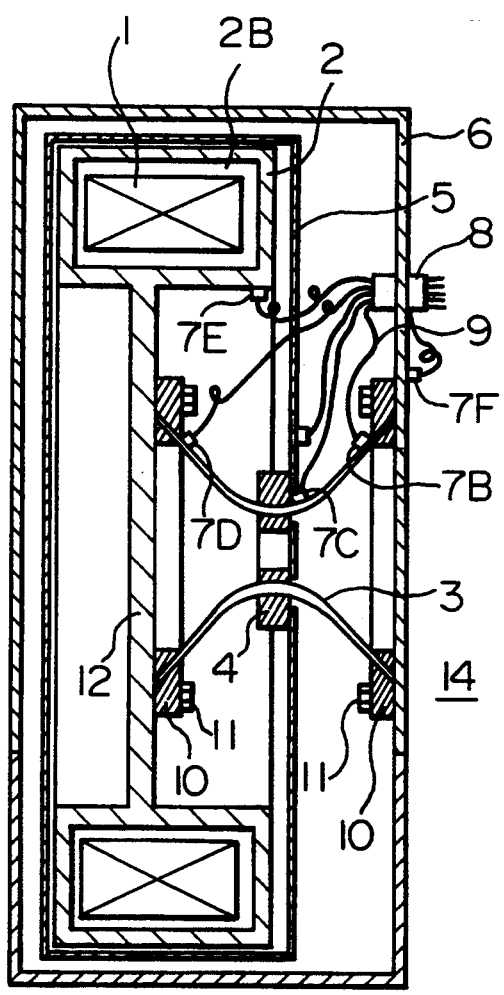
FIG. 1 is a sectional view of a super-conducting magnet according to the present invention.

Referring to FIG. 1, sensors 7B, 7C, 7D, 7E to be selected from such sensors as AE sensors, supersonic sensors, strain gauges, acceleration sensors and temperature sensors are attached at respective suitable positions to each of an inner tank 2, a load support member 3, a shield plate 5 and an outer tank 6.

A superconducting coil 1 is contained in the inner tank 2, with the interior of the inner tank 2 being filled with liquid helium 2B. The inner tank 2 is covered with the shield plate 5 and the shield plate 5 serves to shield against both heat and magnetism.

An inner tank supporting beam 12 spans the interior of the inner tank 2 and forms the seat for attaching the load support member 3, with load support member 3 being fashioned of fiber-reinforced plastics.

The sensors 7B, 7C, 7D, 7E are connected to the outside through lead wire 9 and a hermetic seal connecting terminal and measure AE wave or heat generated from each element during operation (running) or at the time of a periodic inspection or measure the vibration characteristic of each element. Alternatively, a supersonic wave may be inputted to measure transmission or reflection characteristic thereof. Then a comparison is made with an initially measured result of normal state to make an evaluation such as on the occurrence of damage or deterioration of each element, necessity of repair and the remaining service life.

In order to make an evaluation, the supersonic sensor measures the transmitting or reflecting supersonic wave responding to an supersonic wave input in the state where the superconducting magnet 14 is not loaded, with the other sensors measuring the response to a load applied during operation or at the time of a periodic inspection to make an evaluation.

It should be noted that the load support member 3 is fastened at respective ends thereof to the outer tank 6 and the supporting beam 12 by fastener 10 and bolt 11. Furthermore, a thermal anchor 4 is mounted in a through hole portion of the shield plate 5.

Figure 2:
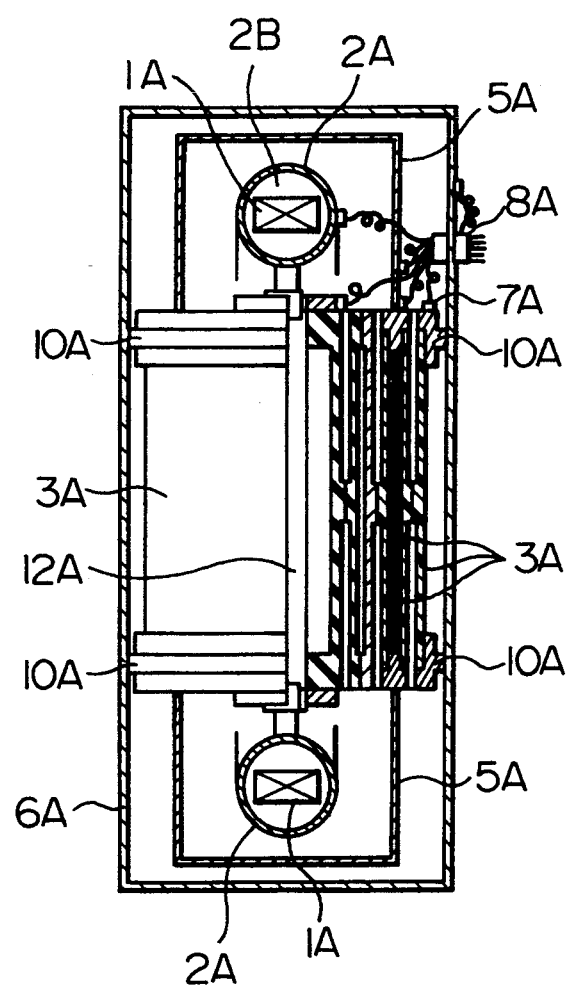
FIG. 2 is a sectional view showing another embodiment of the present invention.

Referring to FIG. 2, a superconducting coil 1A is contained within an inner tank 2A and supported by a load support member 3A. The inner tank 2A is covered with a shield plate 5A and is accommodated in the outer tank 6A. The load support member 3A is formed by a multi-layered fiber-reinforced plastic cylinder, and the innermost periphery of the load support member 3A of the multi-layered cylinder type is coupled to a supporting beam 12A while the outer most periphery thereof is coupled to the outer tank 6A, such as sensor 7A being mounted thereon in a similar manner as the embodiment of FIG. 1. A connection terminal 8A lead wire 9A and numerals 10A are also provided.

Figure 3:
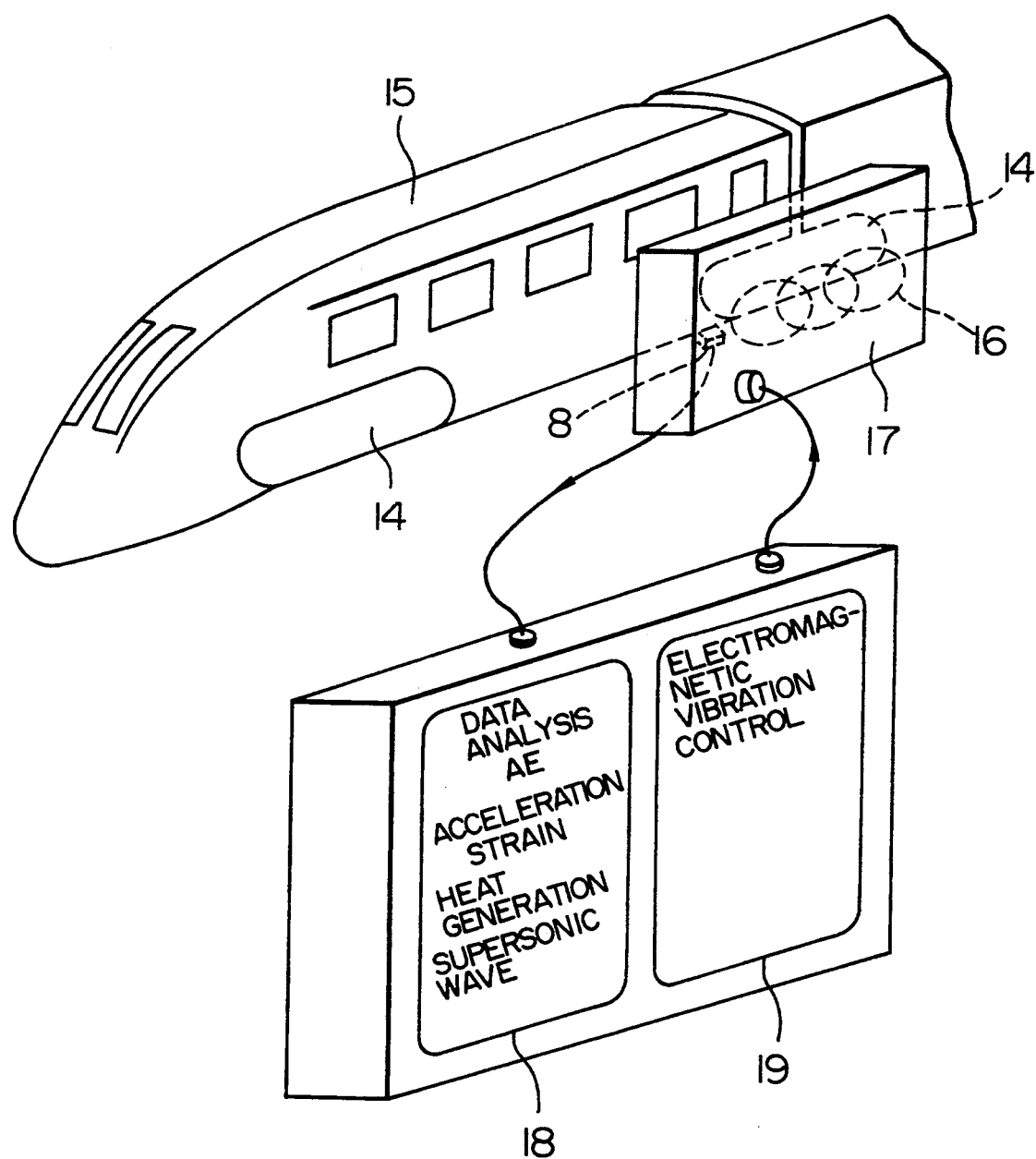
FIG. 3 is a schematic perspective view showing a magnetically levitated train according to the present invention.

As shown in FIG. 3, an electromagnetic vibrating coil 16 for electromagnetically vibrating superconducting magnet 14 and an electromagnetic vibrating base 17 for the support thereof are installed at positions corresponding to the terrestrial coil at which a train 15 to be checked enters an inspection track which branches off from the main track. An electromagnetic vibrating input of a previously defined program is performed by electromagnetic vibration control panel 19 in a state where the electromagnetic vibrating coil 16 and the superconducting magnet 14 are retained at suitable positions with respect to each other. Vibration and heat generating characteristics thereof are measured based on the response of AE sensor, acceleration sensor, strain gage, temperature sensor which are attached to the respective internal elements of the superconducting magnet. A comparison with the result of a measurement which was initially performed when it was normally operated is made to evaluate such as the occurrence of damage or deterioration of each element, necessity of repair and the remaining endurance period. Further, a supersonic sensor is used to measure transmitting or reflecting supersonic waves responding to a supersonic input in the state where the superconducting magnet is not loaded and a comparison with the result of normal state initially measured is made to evaluate such as the damage of like portions.

Figure 4A:
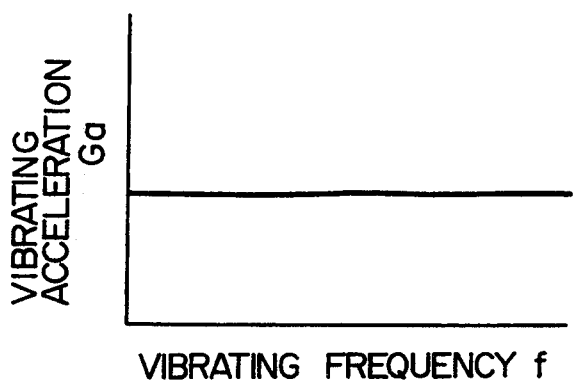
FIG. 4A is a graphical illustration of the relationship between vibrating acceleration and vibrating frequency when an acceleration sensor is employed.
Figure 4B:
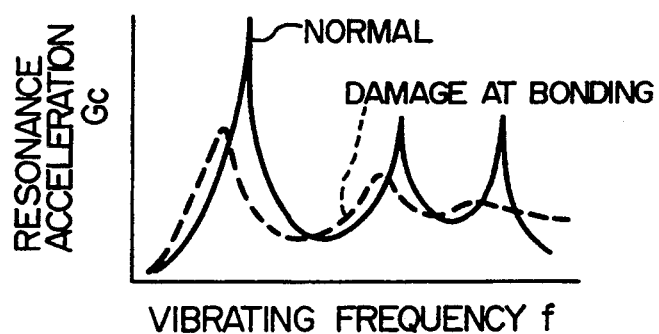
FIG. 4B is a graphical illustration of the relationship between vibrating acceleration and time when an acceleration sensor is employed.
Figure 4C:
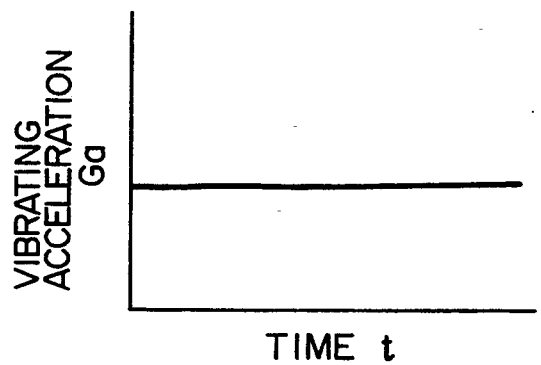
FIG. 4C is a graphical illustration of the relationship between response acceleration and vibrating frequency when a temperature sensor is employed.
Figure 4D:
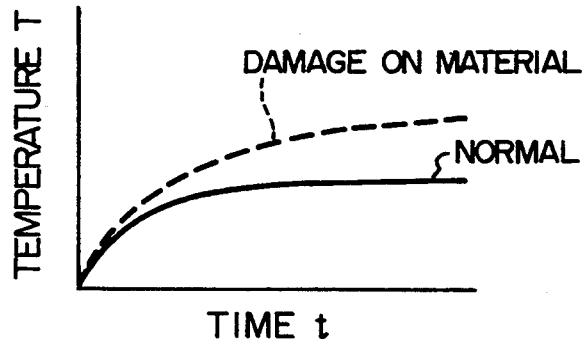
FIG. 4D is a graphical illustration of the relationship between temperature and time when a temperature sensor is employed.

In the embodiment as shown in FIG. 3, when an acceleration sensor is used as the sensor 7B as shown in FIG. 1 and a temperature sensor is used as the sensor 7D and a sweep vibration as shown in FIG. 4A is effected, damage at bonding between the fastener 10A at that speed and the load support member 3A may be found as shown in FIG. 4B from the response acceleration of the acceleration sensor 7B. Further, when vibration of a steady acceleration as shown in FIG. 4C is effected, damage on the load support member 3A in the vicinity thereof may be found as shown in FIG. 4D from the rise of temperature of the temperature sensor 7D.

Figure 5:
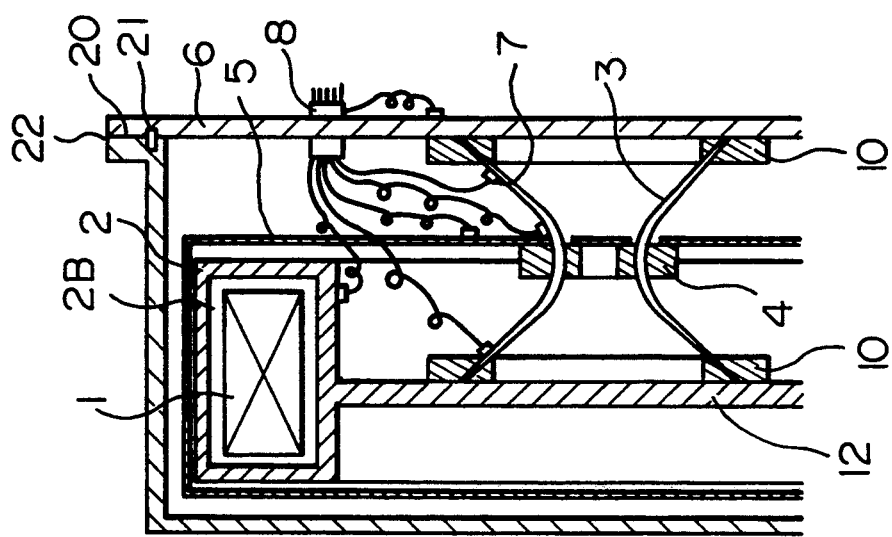
FIG. 5 is a sectional view showing the main portions of still another embodiment of the present invention.

In FIG. 5, a flange 20 is provided on the outer tank in order to facilitate dismantling and reassembling for the repair of a superconducting magnet. By providing a weld 22 for example on the outer periphery thereof, removing of the peripheral weld 22 at the time of dismantling for repair is facilitated and it suffices to similarly weld the remaining periphery of the flange portion at the time of reassembling, so that a large number of repeated dismantling and reassembling is possible. In this case, a plurality of positioning pieces 21 may be embedded into the contacting surface of the flange to improve accuracy and workability of reassembling.

Figure 6:
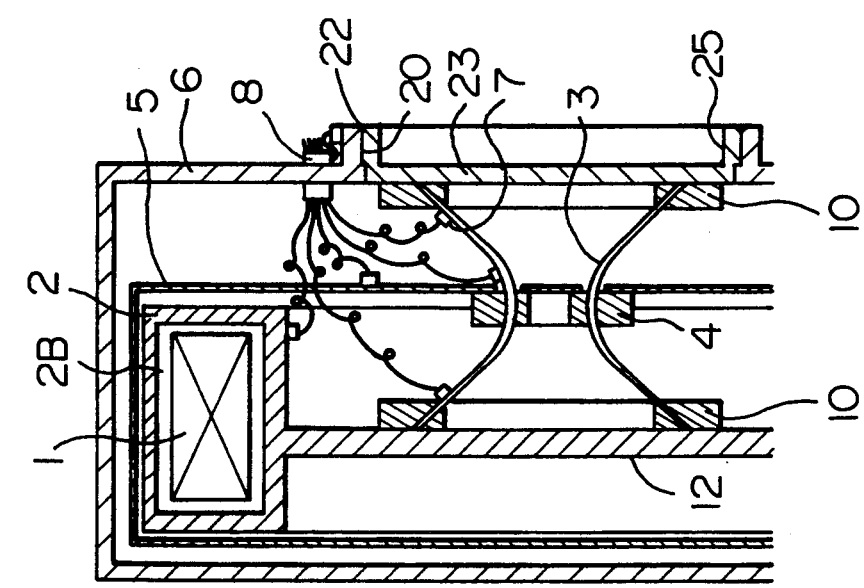
FIG. 6 is a sectional view showing the main portions of a further embodiment of the present invention.

In FIG. 6, in order to facilitate inspection and repair of the load support member 3 which is with a strong likelihood of receiving a damage among the elements within the superconducting magnet, flange 20 is provided on the outer tank 6 and a load supporting seat 23 and a weld 22 is formed at the end portion thereof. Removing of the flange end weld 22 at the time of dismantling for repair becomes easier and, at the time of reassembling, it suffices to weld the remaining flange end portion, thereby enabling a large number of dismantling and assembling operations to be performed. In this case, centering location 25 on the contacting surface of the flange may be provided to improve accuracy and workability of reassembling.

Figure 7:
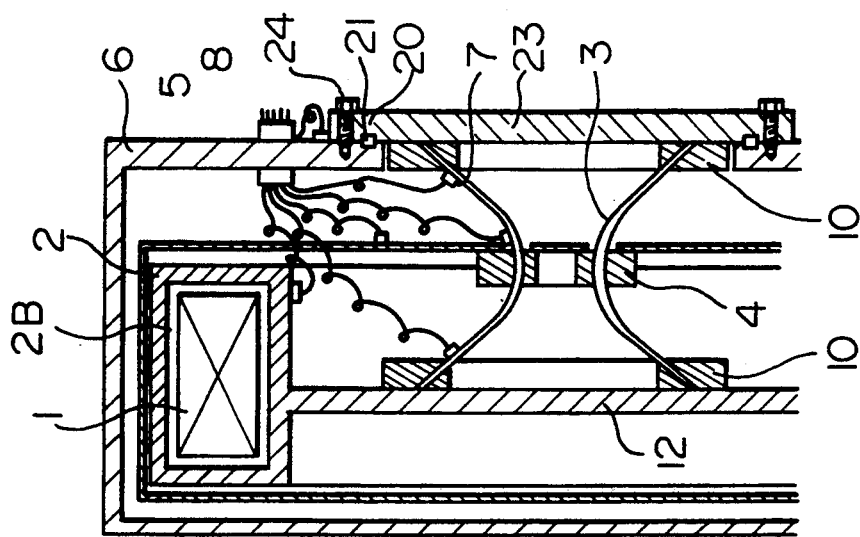
FIG. 7 is a sectional view showing the main portions of a still further embodiment of the present invention.

In FIG. 7, in order to further facilitate dismantling and reassembling for the purpose of inspection and repair in response to a damage within the superconducting magnet, a bolt 24 is used as the fastener instead of welding. In this case, a vacuum seal 21 is provided to prevent of vacuum leakage of the interior of the outer tank 6.

It should be noted that, while in the foregoing embodiments the system for on-line monitoring is shown to be outside the train, it may also be provided within the train.

Figure 8A:
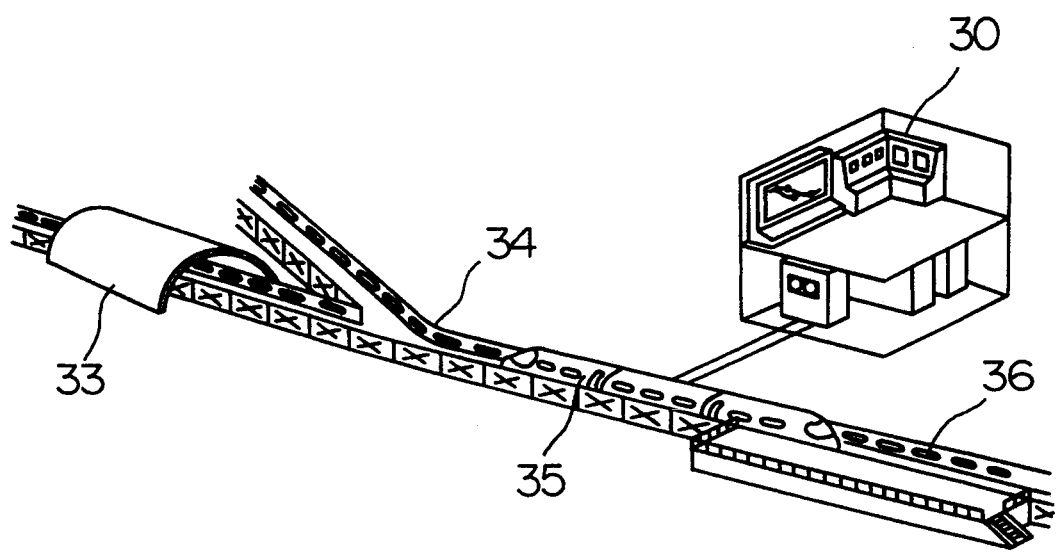
FIG. 8A is a perspective view showing the outline of an apparatus for performing on-line monitoring during running of a superconducting magnetically levitated train according to the present invention.
Figure 8B:
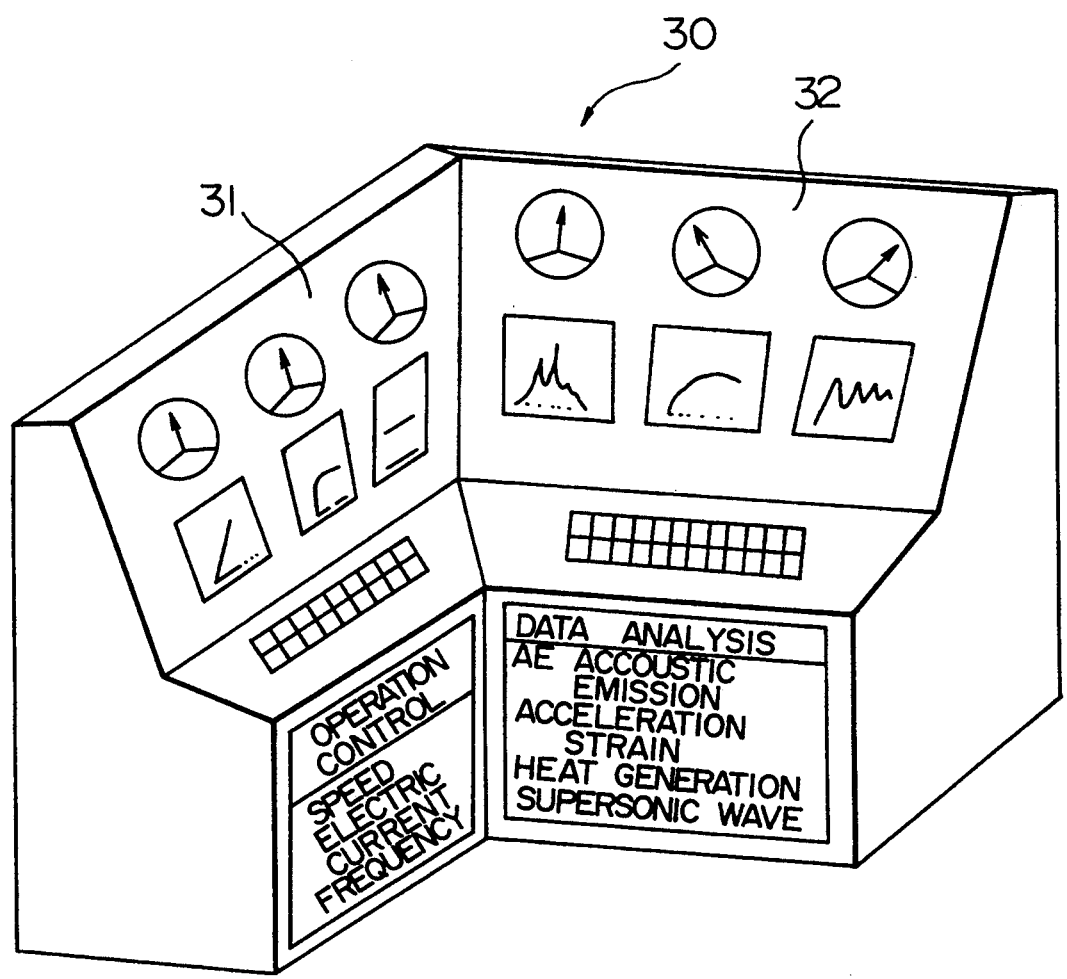
FIG. 8B is an enlarged perspective view of the data panel as shown in FIG. 8A.

With respect to on-line monitoring during running, a data panel as shown in Figs.8A, 8B is provided for example in an operation control room so as to monitor data from the sensors 7A, 7B, 7C, 7D and to analyze the data. Abnormality or damage of the respective portions may be found from the data at the time of running or operation in a similar manner as at the time of periodic inspection as shown in FIG. 3. For this purpose as shown in FIG. 8B a running operation monitor 31 and a data monitor 32 may be provided. In FIG. 8A a tunnel 33 a branching or switching system 34 rolling stock 35 and a terrestrial coil are schematically illustrated. In the present example, informations such as AE (acoustic emission), acceleration, strain, heat generation, supersonic wave are supplied momentary to this cooperation control room and at the same time the information concerning the speed of the vehicle will also be supplied here, and then they will be displaced on the data monitor panel. Based on these informations, electric current to be supplied to the terrestrial coil and the frequency thereof will be controlled.

As shown in FIG. 9, at Step 1, AE, acceleration, strain, generated heat, supersonic waves and light are detected by the sensors attached to the respective component parts of the superconducting magnet. This data is analyzed at Step 2 and, at Step 3, the respective data is compared with the database of each individual abnormality case. In accordance with each abnormality level, such measures as: stopping of operation; slowing down of operation and repair thereafter; or continuing of operation and inspection at the next periodic dismantling are taken. Naturally, if no abnormality is found, the regular operation is continued.

According to the present invention, on-line measurements are possible of AE, vibration, heat generation or the like of the respective elements during operation of a superconducting magnet, or actual measurements are possible of vibration response, AE wave response, heat generation response of the respective elements with respect to a criterional dynamic load given at the time of a periodic inspection. Based on comparison made with measured result of these in the initial state where they were normally operated, such as the occurrence of damage and necessity of repair may be evaluated. Further, since a rib flange is provided on the outer tank, a large number of dismantling and reassembling of the outer tank becomes possible, thereby the maintenance of the superconducting magnet is greatly facilitated.

What is claimed is:

1. A superconducting magnet comprising:
   a superconducting coil;
   an inner tank for containing the coil;
   a shield plate for covering the inner tank;
   an outer tank for accommodating said superconducting coil, the inner tank and the shield plate; and
   wherein said inner tank is supported on said outer tank by a load support member, said outer tank forming a vacuum vessel; and
   wherein at least one of the inner tank, the load support member, the shield plate and the outer tank includes detection means belonging thereto for detecting abnormality and/or deterioration of at least one of the inner tank, the load support member, the shield plate and the outer tank.

2. A superconducting magnetic comprising:
   a superconducting coil;
   an inner tank for containing the coil;
   a shield plate for covering the inner tank;
   an outer tank for accommodating said superconducting coil, the inner tank and the shield plate; and
   wherein said inner tank is supported on said outer tank by a load support member, said outer tank forming a vacuum vessel; and
   wherein at least one of the inner tank, the load support member, the shield plate and the outer tank includes detection means belonging thereto for detecting abnormality and/or deterioration of at least one of the inner tank, the load support member, the shield plate and the outer tank, and
   wherein electric connection means between the detection means and an external monitor is provided to enable on-like monitoring of data from said detection means.

3. A superconducting magnetic comprising:
   a superconducting coin.;
   an inner tank for containing the coil;
   a shield plate for covering the inner tank;
   an outer tank for accommodating said superconducting coil, the inner tank and the shield plate; and
   wherein said inner tank is supported on said outer tank by a load support member, said outer tank forming a vacuum vessel; and
   wherein at least one of the inner tank, the load support member, the shield plate and the outer tank has detection means belonging thereto for detecting abnormality and/or deterioration of at least one of the inner tank, the load support member, the shield plate and the outer tank, and
   wherein said outer tank has an opening for the maintenance of an interior thereof and the opening is closed by a flange.

4. A superconducting magnetic according to claim 3, wherein electric connection means between said detection means and an external monitor is provided to enable on-line monitoring of data from said detection means.

5. A superconducting magnet according to claim 2, wherein a flange is provided at a coupling portion between said outer tank and the load support member.

6. A superconducting magnetic according to claim 5, wherein electric connection means between said detection means and an external monitor is provided to enable on-line monitoring of data from said detection means.

7. A superconducting magnetic comprising:
   a superconducting coil;
   an inner tank for containing the coil;
   a shield plate for covering the inner tank;
   an outer tank for accommodating said superconducting coil, the inner tank and the shield plate; and
   wherein said inner tank is supported on said outer tank by a load support member, said outer tank forming a vacuum vessel; and
   wherein at least one of the inner tank, the load support member, the shield plate and the outer tank includes detection means belonging thereto for detecting abnormality and/or deterioration of at least one of the inner tank, the load support member, the shield plate and the outer tank, and
   wherein said detection means is attached to at least each of the inner tank, the load support member, the shield plate and the outer tank.

8. A superconducting magnet according to claim 2, wherein said detection means is one selected from the group of acoustic emission (AE) sensors, supersonic sensor, strain gauges, acceleration sensors and temperature sensors.

9. A superconducting magnetic according to claim 7, wherein a plurality of types selected from the group of acoustic emission (AE) sensors, supersonic sensors, strain gauges, acceleration sensors and temperature sensors are provided respectively at least at each of the inner tank, the load support member, the shield plate and the outer tank.

10. A superconducting magnet according to claim 2, wherein abnormality or deterioration of the portions to be detected is diagnosed or evaluated by said on-line monitoring during operation or during a periodic inspection of the superconducting magnet.

11. A superconducting magnet according to claim 3, wherein abnormality or deterioration of of the portions to be detected is diagnosed or evaluated by said on-line monitoring during operation or during a periodic inspection of the superconducting magnet.

12. A superconducting magnet according to claim 5, wherein abnormality or deterioration of the portions to be detected is diagnosed or evaluated by said on-line monitoring during operation or during a periodic inspection of the superconducting magnet.

13. A superconducting magnet according to claim 3, wherein an end portion of said flange is fixed to the outer tank by welding.

14. A superconducting magnet according to claim 3, wherein said flange is fastened to the outer tank by a bolt and a vacuum seal mechanism is provided one a flange contacting surface.

15. A superconducting magnet comprising:
   a superconducting coil;
   an inner tank for containing the coil;
   a shield plate for covering the inner tank;
   an outer tank for accommodating said superconducting coil, the inner tank and the shield plate; and
   said inner tank being supported on said outer tank by a load support member, said outer tank forming a vacuum vessel; and
   wherein said outer tank has an opening for maintenance of the interior of said outer tank and the opening is closed by a flange, an end portion of said flange being fixed to the outer tank by welding, 16. A magnetically levitated transportation apparatus having a superconducting magnet disposed at lower portions of opposite side surfaces of the body thereof, said superconducting magnetic comprising:
   a superconducting coil;
   an inner tank for containing the coil;
   a shield plate for covering the inner tank;
   an outer tank for accommodating said superconducting coil, the inner tank and the shield plate; and
   wherein said inner tank is supported on said outer tank by a load support member, said outer tank forming a vacuum vessel;
   wherein a system capable of applying a dynamic or static load to the superconducting magnetic from the outside of said superconducting magnet is provided and at least one of said inner tank, the load support member, the shield plate and the outer tank includes detection means belonging thereto for detecting abnormality and/or deterioration of at least one of the inner tank, the load support member, the shield plate and the outer tank to enable diagnosis and/or evaluation of abnormality and/or deterioration of at least one of the inner tank, the load support member, the shield plate and the outer tank based upon response of said detection means with respect to said load.

17. A magnetically levitated transportation apparatus according to claim 16, wherein electric connection means is further provided between the detection means and an external monitor to enable on-line monitoring of data from said detection means.

18. A magnetically levitated transportation apparatus according to claim 16, wherein said outer tank has an opening for maintenance of the interior thereof and the opening is closed by a flange.

19. A magnetically levitated transportation apparatus according to claim 18, wherein electric connection means is further provided between said detection means and an external monitor to make possible on-line monitoring of data from said detection means.

20. A magnetically levitated transportation apparatus according to claim 16, wherein a flange is provided at a coupling portion between said outer tank and the load support member.

21. A magnetically levitated transportation apparatus according to claim 20, wherein electric connection means is further provided between said detection means and an external monitor to enable on-line monitoring of data from said detection means.

22. A magnetically levitated transportation apparatus according to claim 16, wherein said load system comprises an electromagnetic vibrating apparatus.

23. A magnetically levitated transportation apparatus according to claim 16, wherein said detection means is attached to at least each of the inner tank, the load support member, the shield plate and the outer tank.

24. A magnetically levitated transportation apparatus according to claim 16, wherein said detection means is one selected from the group acoustic emission (AE) sensor, supersonic sensor, strain gage, acceleration sensor and temperature sensor.

25. A magnetically levitated transportation apparatus according to claim 23, wherein a plurality of types selected from the group of acoustic emission (AE) sensors, supersonic sensors, strain gauges, acceleration sensors and temperature sensors are provided respectively at each of the inner tank, the load support member, the shield plate and the outer tank.

26. A magnetically levitated transportation apparatus according to claim 17, wherein abnormality or deterioration of the portions to be detected is diagnosed or evaluated by said on-line monitoring during operation or during a periodic inspection of the superconducting magnet.

27. A-magnetically levitated transportation apparatus according to claim 19, wherein abnormality or deterioration 6f the portions to be detected is diagnosed or evaluated by said on-line monitoring during operation or during a periodic inspection of the superconducting magnet.

28. A magnetically levitated transportation apparatus according to claim 21, wherein abnormality or deterioration of the portions to be detected is diagnosed or evaluated by said on-line monitoring during operation or during a periodic inspection of the superconducting magnet.

29. A superconducting magnet according to claim 1, wherein the detection means detects the abnormality and/or deterioration thereof during operation of the superconducting magnet.

* * * * *